(No Model.)

W. H. RASCOE.
FRICTION CLUTCH.

No. 300,503. Patented June 17, 1884.

WITNESSES:
C. Neveux
C. Sedgwick

INVENTOR:
W. H. Rascoe
BY Munn & Co
ATTORNEYS.

United States Patent Office.

WILLIAM H. RASCOE, OF PLATTSBURG, NEW YORK, ASSIGNOR TO HIMSELF AND CHARLES S. RASCOE, OF SAME PLACE.

FRICTION-CLUTCH.

SPECIFICATION forming part of Letters Patent No. 300,503, dated June 17, 1884.

Application filed April 19, 1884. (No model.)

*To all whom it may concern:*

Be it known that I, WILLIAM H. RASCOE, of Plattsburg, in the county of Clinton and State of New York, have invented a new and Improved Friction-Clutch, of which the following is a full, clear, and exact description.

The object of my invention is to provide a new and improved friction-clutch which is simple in construction and has no lost motion whatever.

The invention consists in the combination, with a shaft, of a loose wheel provided with recesses containing rollers against which blocks rest, which are pressed by springs against the rollers, causing the rollers to bind on the wheel or shaft when the said wheel and shaft revolve in one direction, but not when they revolve in the reverse direction.

Reference is to be had to the accompanying drawings, forming part of this specification, in which similar letters of reference indicate corresponding parts in all the figures.

Figure 1:
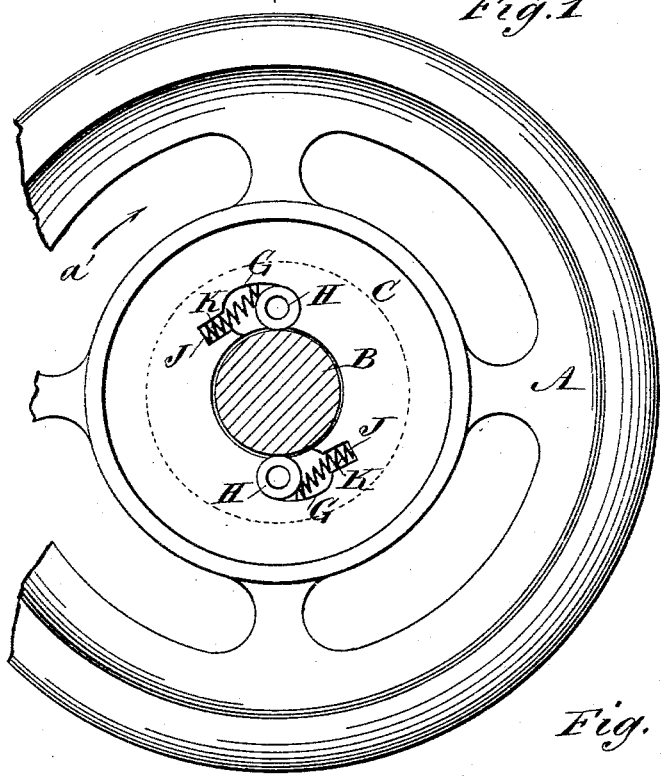
Figure 2:
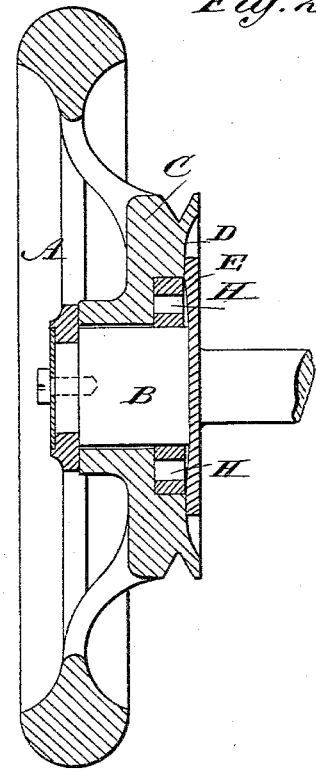
Figure 3:
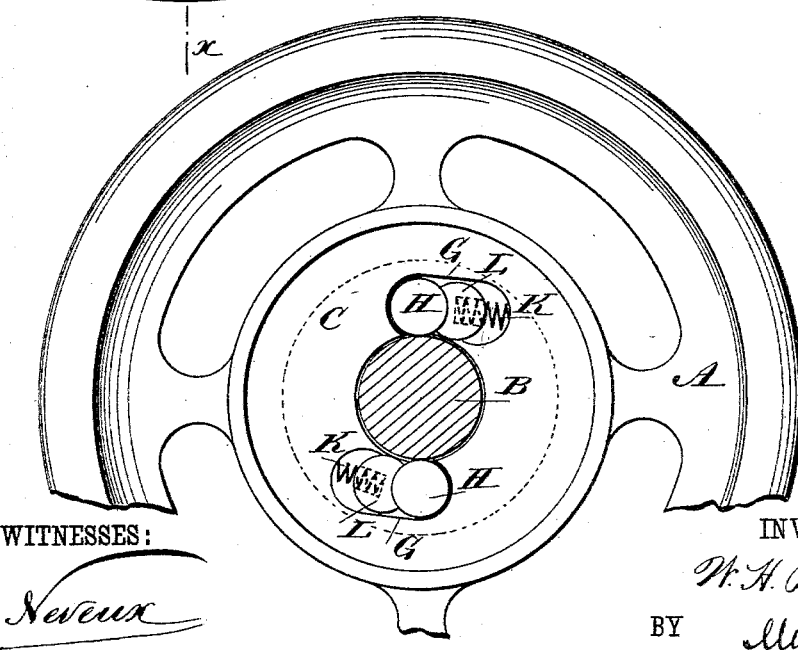

Figure 1 is an inside face view of my improved clutch, the covering-plate being removed. Fig. 2 is a vertical sectional view of the same on the line $x\ x$, Fig. 1. Fig. 3 is an inside face view of an improvement on the clutch shown in Figs. 1 and 2.

The wheel A is mounted loosely on the shaft B. The hub C of the wheel A is provided on the inner side with a recess, D, in which a covering-plate, E, is held. Adjoining the opening through which the shaft B passes two or more recesses, G, are formed in the recessed inner side of the hub, and each recess G contains a clutch-roller, H, the axis of which is parallel with the axis of the shaft B. One end of each recess G is rounded, so that the roller H can fit snugly against the said end. The back of the said recess is slightly beveled toward the rounded end of the recess, so that when the roller H runs along the said inclined or beveled back it will at the same time be moved toward the shaft. In that end of the recess opposite the one that is rounded a socket, J, is formed, in which one end of a spiral spring, K, is held, the other end resting against the corresponding roller, H. In the construction shown in Fig. 3, the springs K do not act directly on the rollers H, but on blocks or plugs L, resting against the rollers, on which they fit closely. If the shaft B revolves in the inverse direction of the arrow $a'$, the rollers H are moved by the shaft in the direction toward the sockets J of the recesses G, and the rollers will not bind on the shaft, but revolve quite freely in the recesses, and the fly-wheel A will not be revolved; or, if the wheel A is revolved, the rollers H will not grip on the shaft which will not be revolved. If the shaft B is revolved in the direction of the arrow $a'$, the rollers H will be jammed in between the narrow ends of the recesses and the shaft, and will bind on the shaft and wheel, whereby the wheel will be revolved with the shaft. If the wheel A is revolved in the direction of the arrow $a'$, the rollers H will grip on the wheel and shaft, and the shaft will be revolved with the wheel. The springs K at all times press the rollers H toward the narrower ends of the recesses G, thus causing them to bind instantly, whereby all lost motion is avoided. The blocks or plugs L produce less friction on the rollers than the ends of the springs do, and for this reason they are preferred.

Having thus described my invention, I claim as new and desire to secure by Letters Patent—

The combination, with a shaft, of the wheel A, provided with the recesses G in the sides of the opening for the shaft, the rollers H in the recesses, the plugs or blocks L, resting against the rollers, and the springs K, interposed between the blocks L and the ends of the recesses, substantially as herein shown and described.

WILLIAM H. RASCOE.

Witnesses:
 NORMAN PEARL,
 A. P. GAUTHIER.